3,294,520
Patented Dec. 27, 1966

3,294,520
SYNERGISTIC HERBICIDAL COMPOSITION
AND METHOD
Duane R. Arneklev, Sunnyvale, and Ralston Curtis, Los Altos, Calif., assignors to Stauffer Chemical Company, New York, N.Y., a corporation of Delaware
No Drawing. Filed Nov. 17, 1964, Ser. No. 411,732
2 Claims. (Cl. 71—2.3)

This invention relates to the use of N-[2-(O,O-di-isopropyldithiophosphoryl)ethyl]benzenesulfonamide as a synergist for increasing the phytotoxicity of 2,4-dichlorophenoxyacetic acid and its related compounds.

The control of grasses and weeds in growing commercial crops is a reoccurring problem to agronomists. Many herbicides have been developed which control broad varieties of weeds, as well as selected varieties of weeds. Evaluation must be made as to the effective range of weed control of any proposed herbicidal regulator.

As might be expected, a considerable assortment of phytotoxic materials have been developed and exploited for the control of weeds. Among this assortment of herbicidal materials is the very effective class of compounds known as the chlorophenoxy herbicides, including such compounds as 2,4-dichlorophenoxyacetic acid, its salts, such as the sodium salt, and its esters, such as the butyl and octyl compounds. Following common usage, the term 2,4-D will be used hereinafter as a generic term covering the parent acid and its derivatives. The use of 2,4-D at the recommended rates generally gives good control substantially exclusively to plants of the broad leafed or dicotyledonous type, having little if any effect on narrow leafed or monocotyledonous plants. 2,4-D does not only kill plants by contact action; it translocates from the tops into the roots, thereby killing the root system thus preventing regrowth. It is absorbed from the soil by young seedlings with fatal results and hence finds some utility in the pre-emergence method. The need for improved control methods and compositions is evident.

It has been discovered that the combination of 2,4-dichlorophenoxyacetic acid and its related compounds and N-[2-(O,O-diisopropyldithiophosphoryl)ethyl]benzenesulfonamide constitutes a preferred herbicidal composition for the improved control of annual grass weeds and broadleaf weeds, and that in such composition combinations the compounds are mutually activating to accomplish a synergistic result.

More specifically, this invention relates to the use of the synergistic combination of compounds of the general formula

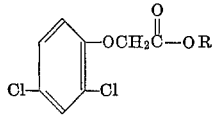

wherein R is hydrogen, an alkyl radical, an alkali metal or ammonium radical and of the compound N-[2-(O,O-diisopropyldithiophosphoryl)ethyl]benzenesulfonamide for the control of annual grass weeds and broadleaf weeds.

To be an effective synergistic combination the present invention must show mutual interaction of the phytotoxic chemicals so as to produce a response which is greater than the sum of each individual phytocide. The said interaction is the relation of one material to the effectiveness of a second. The interaction can be of great importance in herbicidal formulation and activity. The actual interaction of the phytotoxic materials may not be known, be it penetration, an ultimate biochemical effect, or a combined effect at the action site; however, the effect of the interaction may be quite noticeable.

The compounds of the present invention can be employed along with a carrier in the form of a spray or dust composition. In operating in accordance with the present invention, a mixture of 2,4-dichlorophenoxyacetic acid or any of its related compounds and N-[2-(O,O-diisopropyldithiophosphoryl)ethyl]benzenesulfonamide can be so compounded as to produce herbicidal concentrates adaptable to use of the preparation in spray or dust mixtures. Methods of adaption of the herbicides to produce useful spray mixtures, dusts or drenches will be evident to those skilled in the art.

Any suitable proportion of the 2,4-dichlorophenoxyacetic acid or its related compounds may be employed in combination with N-[2-(O,O-diisopropyldithiophosphoryl)ethyl]benzenesulfonamide. The preferred amounts of materials are dependent upon the method of application, the nature of the weed to be controlled, as well as the commercial crop also possibly present.

The following example illustrates the effective interaction of the combination of the present invention.

EXAMPLE

The herbicidal compositions were applied employing a preplanting incorporated soil treatment. This was accomplished by spraying the soil in metal flats 8" wide, 12" long and 3" deep and incorporating immediately by mixing the soil in a small cement mixer. Seeds were planted ½" deep in the soil after placing the mixed soil back in the metal flats. Individual rows of the weed seeds were planted. The weeds used included crabgrass, watergrass, foxtail, pigweed, lamb's-quarter and Jimson weed. The flats were placed in a greenhouse at 80° F. and watered regularly. The percent control ratings given in Table I were made at 30 days. The following table is a comparison of each component, N-[2-(O,O-diisopropyldithiophosphoryl)ethyl]benzenesulfonamide, "N-2," and "2,4-D" independently and in reduced concentration in combination.

Table I

| Treatment lb./A incorporated, N-2+ 2,4-D | Percent Weed Control | | |
|---|---|---|---|
| | Crabgrass | Pigweed | Jimson weed |
| 2+¼ | 80 | 100 | 30 |
| 4+0 | 70 | 60 | 10 |
| 0+1 | 10 | 70 | 0 |
| | Watergrass | Foxtail | Dock | Lamb's quarter |
| 1+¼ | 50 | 30 | 80 | 100 |
| 2+0 | 20 | 0 | 0 | 90 |
| 0+¼ | 0 | 0 | 40 | 60 |

It can be seen from the table that the combination of the benzenesulfonamide at 2 lbs/a. and 2,4-D at ½ lb./a. results in an increased herbicidal effect on the listed weeds. The combination of agents was better than either of the compounds alone at 4 lbs./a. of the benzenesulfonamide and 1 lb. of the 2,4-D. Even at lower concentrations the effective synergism was maintained.

Various changes and modifications may be made with-

We claim:

1. A synergistic herbicidal composition comprising N-[2 - (O,O - diisopropyldithiophosphoryl)ethyl]benzenesulfonamide and a material selected from the group consisting of 2,4-dichlorophenoxyacetic acid, its related salts and alkyl esters.

2. An improved method for combating weeds comprising applying to the soil a phytotoxic amount of the synergistic herbicidal composition comprising N-[2-(O,O-diisopropyldithiophosphoryl)ethyl]benzenesulfonamide and a material selected from the group consisting of 2,4-dichlorophenoxyacetic acid, its related salts and alkyl esters.

References Cited by the Examiner

UNITED STATES PATENTS 3,205,253  9/1965  Francher et al. _____ 71—2.6
3,231,362  1/1966  Pfeiffer _____ 71—2.6

LEWIS GOTTS, *Primary Examiner.*

JAMES O. THOMAS, JR., *Examiner.*